United States Patent
Asia et al.

(10) Patent No.: US 6,594,467 B2
(45) Date of Patent: Jul. 15, 2003

(54) UNIDIRECTIONAL COMMUNICATION SCHEME FOR REMOTE MAINTENANCE AND CONTROL IN A BROADBAND WIRELESS ACCESS SYSTEM

(75) Inventors: Raul Asia; Jack Bettan; Yaron Fishler; Abraham Bernstein, all of Jerusalem; Oded Stern, Mevaseret-Zion; Eddi Shensaif, Jerusalem, all of (IL)

(73) Assignee: Vyyo Ltd., Cupertino, CA (US)

( * ) Notice: Subject to any disclaimer, the term of this patent is extended or adjusted under 35 U.S.C. 154(b) by 0 days.

(21) Appl. No.: 09/771,166

(22) Filed: Jan. 26, 2001

(65) Prior Publication Data

US 2002/0009970 A1 Jan. 24, 2002

Related U.S. Application Data

(60) Provisional application No. 60/178,303, filed on Jan. 26, 2000.

(51) Int. Cl.[7] .................. H04H 1/14; H04B 15/00; H04B 1/10; H04B 1/38; H04M 11/00
(52) U.S. Cl. .................. 455/3.03; 455/67.1; 455/62; 455/63; 455/69; 455/419; 455/420; 455/88; 455/92; 375/222; 379/93.28; 379/93.31

(58) Field of Search ............ 455/67.1, 62, 63, 455/513, 423, 450, 509, 69, 515, 70, 556, 557, 419, 507, 88, 418, 470, 3.03, 92; 375/222; 379/93.28, 93.31

(56) References Cited

U.S. PATENT DOCUMENTS

| 4,385,384 A | * | 5/1983 | Rosbury et al. ............. 714/717 |
| 5,471,645 A | * | 11/1995 | Felix ........................... 455/516 |
| 5,867,528 A | * | 2/1999 | Verbueken .................. 375/222 |
| 6,151,355 A | * | 11/2000 | Vallee et al. ................. 375/220 |
| 2001/0040918 A1 | * | 11/2001 | Krinsky et al. ............. 375/222 |

FOREIGN PATENT DOCUMENTS

EP 0 021 544 A1 * 1/1981 .................. 375/222

* cited by examiner

Primary Examiner—Nay Maung
Assistant Examiner—Raymond B Persino
(74) Attorney, Agent, or Firm—Crosby, Heafey, Roach & May; John W. Carpenter

(57) ABSTRACT

A system and method for remote maintenance and service of one or more wireless modems in communication with a wireless hub is provided. The system and method include the capability of the wireless hub to instruct the wireless modem(s) to change any operational parameters in order for the wireless hub to diagnose any problems with or to improve operation of the wireless mode.

22 Claims, 3 Drawing Sheets

DOCSIS SYSTEM

UNIDIRECTIONAL COMMUNICATION SCHEME FOR REMOTE MAINTENANCE AND CONTROL IN A BROADBAND WIRELESS ACCESS SYSTEM

CROSS REFERENCE TO RELATED APPLICATIONS AND CLAIM OF PRIORITY

This invention claims priority to the following co-pending U.S. provisional patent application, which is incorporated herein by reference, in its entirety:

Asia et al, Provisional Application Ser. No. 60/178,303, entitled "A UNIDIRECTIONAL COMMUNICATION SCHEME FOR REMOTE MAINTENANCE AND CONTROL IN A BROADBAND WIRELESS ACCESS SYSTEM," filed Jan. 26, 2000.

BACKGROUND OF THE INVENTION

1. Field of Invention

The present invention relates to broadband wireless access systems, and amongst other things to a method of dynamically scheduling multiple upstream channel transmission in a broadband wireless access system.

1. Discussion of Background

Point to multipoint fixed broadband wireless access systems over MMDS networks are known in broadcast situations. These networks operate over licensed bands including the MMDS band (2,150 to 2,162 MHz), the WCS band (2,305 to 2,360 MHz) and the ITFS/MMDS bands (2,500 to 2,686 MHz).

A known wireless broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of a wireless DOCSIS system is depicted in FIG. 1. A CMTS 10 communicates with a wide area network 20, such as the internet. The CMTS 10 can transmit signals from the wide area network 20 along a cable network 30 through cable modems 40 to CPE 50 (Customer Premise Equipment—intended throughout this document to include a computer and/or all of the equipment at the customer site, such as a LAN—Local Area Network). CPE 50 messages can be transmitted to the wide area network 20 through the cable modem 40 along the cable network 30 to the CMTS 10.

In point to multipoint broadband wireless access systems one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined in one or more channels. The signal path from the central endpoint to the nodes is referred to as downstream, while the signal path from the nodes to the central end-point is referred to as upstream.

A single upstream channel can be used to deliver information from a node to the head-end and a downstream channel is used from the head-end to a node or a group of nodes. If a single upstream channel is used for communication from the nodes(s) to the central point, then only one end-point can sends information on the single upstream channel at any one time.

Point to Multipoint Broadband-Wireless Access systems are typically asymmetrical with upstream channels operating at lower speeds than the downstream channels. The downstream channel(s) typically carry a continuous signal to all the CMs. This signals includes operational information (such as synchronization) that is necessary to establish the upstream channel. The establishment of the downstream communication is a precondition for the system to start the relatively complex and less reliable process of upstream communication. Problems can occur when there are failures in upstream communication while the more reliable downstream channel is still transmitting, this may lead to situations where there is downstream communication with a modem having non-operational upstream. This is a waste of downstream channel bandwidth and further causes problems for the user.

The Data Over Cable System Interface Specification (DOCSIS), Cable Modem To Customer Premises Equipment Specification SP-CMCI-I03-991115, defines that the CM may have self-diagnostic capability.

However, the CM can only have information about itself and has no knowledge regarding the rest of the network. Further, the processing and memory capability of the CM make it difficult to perform sophisticated diagnostics utilizing its own capabilities.

SUMMARY OF THE INVENTION

A present invention provides for remote maintenance and service of one or more wireless modems in communication with a wireless hub is provided. This includes the capability of the wireless hub to instruct the wireless modem(s) to change any operational parameters in order for the wireless hub to diagnose any problems with or to improve operation of the wireless mode. An additional feature of the present invention allows for the creation of predictive models based upon changes to the transmission characteristics of the wireless modem(s) based upon the changes to any parameters.

In one embodiment, the present invention provides for a system and method for communication between a wireless modem and wireless hub on a selected downstream channel of a plurality of downstream channels. The selected downstream channel is chosen by the wireless modem after receiving communication parameters for each of the downstream channels and choosing the selected downstream channel by determining the most efficient of the downstream channels at that time for downstream communication.

In another embodiment, the present invention provides for a system and method for communication between a wireless modem and wireless hub on one selected upstream channel from a plurality of downstream channels. The selected upstream channel is selected by the wireless modem after receiving communication parameters for each of the upstream channels and selecting the selected upstream channel by determining the most efficient of the upstream channels at that time for upstream communication. It is also possible that this embodiment, is combined with the first embodiment such that the plurality of upstream channels are associated with the selected downstream channel.

The present invention is embodied as a method for remotely testing a wireless modem in communication with a wireless hub, comprising, synchronizing a wireless modem with a wireless hub on a downstream channel of a plurality of downstream channels, receiving information at the wireless modem corresponding to a plurality of upstream channels that can be used to communicate from the wireless modem to the wireless hub, placing the wireless modem into a service mode, by transmitting from the wireless hub an instruction for the wireless modem to operate in the service mode, and testing at least one parameter of the wireless modem to determine the optimal channel for upstream communication from the wireless modem to the wireless hub. In addition, the invention includes A method for remotely servicing a wireless modem in communication with a wireless hub, comprising, transmitting from the wireless hub to the wireless modem a first information signal, receiving the first information signal transmitted from the wireless hub to the wireless modem at the wireless modem, transmitting from the wireless modem to the wireless hub a second information signal, failing to receive the second information signal transmitted from the wireless modem to the wireless hub at the wireless hub, transmitting an instruction from the wireless hub to the wireless modem instructing the wireless modem to operate in a service mode, operating the wireless modem in a service mode, and testing at least one of several parameters of the wireless modem to reestablish an upstream communication path from the wireless modem to the wireless hub. Still further, the invention includes a method of communicating with a modem having service mode capabilities, comprising the steps of, initiating a service mode in the modem, incrementally changing parameter values of said modem until an upstream channel communicated by said modem is acquired by a hub, and initiating another mode of operation.

The invention may also be embodied as a device (modem), comprising, a reception device configured to receive downstream communications from a hub, a service mode mechanism configured to identify a service mode request for the modem and place the modem in a service mode, and a service mode command mechanism configured to identify and perform service mode commands.

Both the modem and methods may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
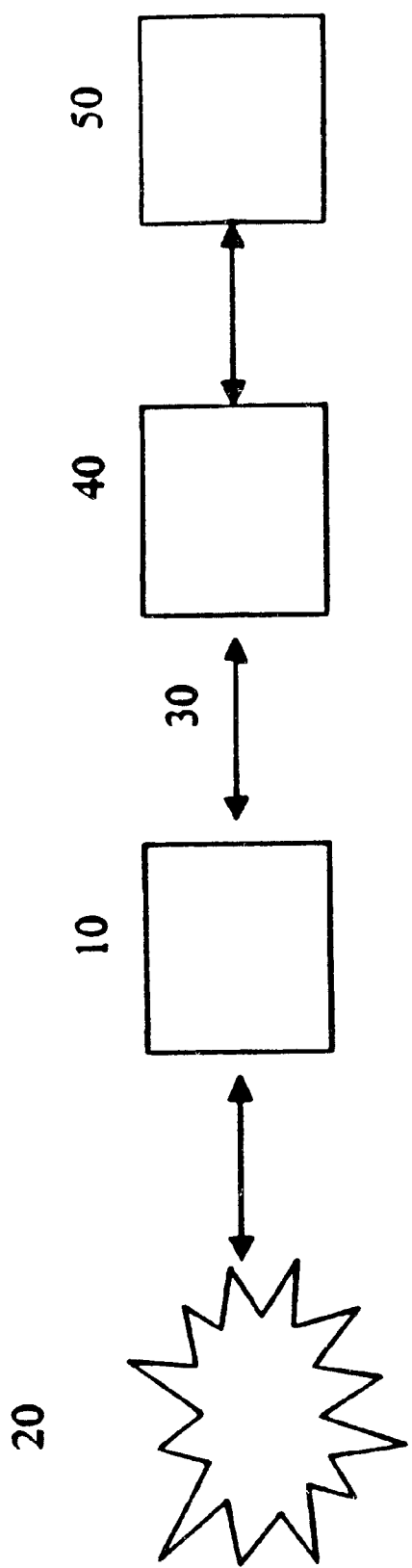
FIG. 1 is an overview of a known data over cable system.
Figure 2:
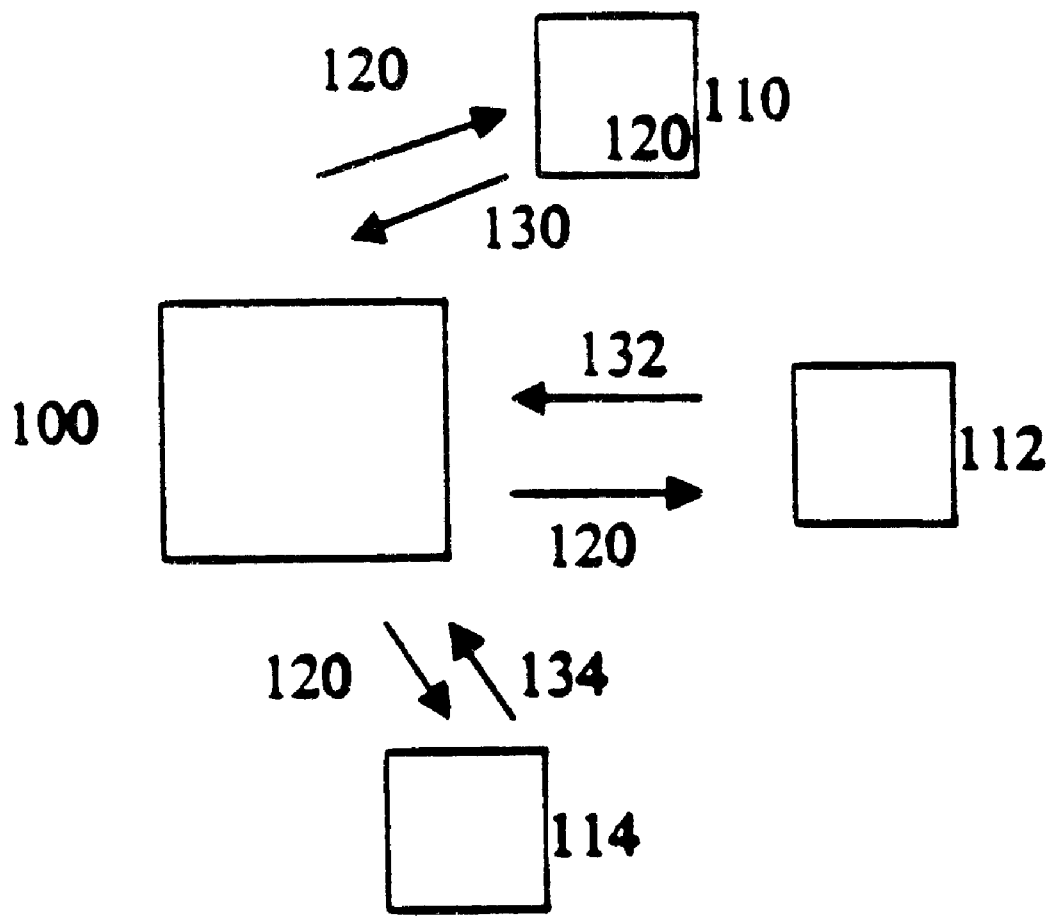
FIG. 2 is a block diagram of a wireless hub communicating with a plurality of wireless modems in a broadband wireless access system according to a presently preferred embodiment of the present invention.

Referring again to the drawings, wherein like reference numerals designate identical or corresponding parts, and more particularly To FIG. 2 thereof, there is illustrated, in The presently preferred embodiment, a wireless hub 100 communicates with a number of wireless modems 110, 112 and 114 on downstream channel 120 and upstream channels 130, 132 and 134 respectively. If The wireless hub 100 Determines that several transmissions from a wireless modem 112 on an upstream channel 132 are not within the parameter that The wireless hub 100 has transmitted in a UCD message, The wireless hub can remotely service the wireless modem 112 until such a time that its parameters are within The range specified in the UCD message. The UCD message utilized is described in as described in DOCSIS RFI document SP-RFIv1.1-I03-991105. DOCSIS RFI document SP-RFIv1.1-I03-991105 and the other DOCSIS specification are incorporated herein by reference in their entirely. Additionally, wireless hub 100 can periodically perform remote maintenance operations a wireless modem 112. The operations include the capability to alter any of the transmission parameters of the wireless modem, including but not limited to, Transmission power, transmission frequency, modulation scheme, the upstream channel frequency on which The wireless modem transmits, the antenna positioning (or sector selection), and the FEC factor.

The network management software of the wireless hub will preferably operate such that it is assumed that the downstream channel is robust, has the appropriate power, modulation scheme, frequency, and antenna sectorization, when bringing the upstream channel to an operational state. After the wireless modem becomes operational, i.e. completes the registration process; the wireless hub is able to improve the quality of the communication by utilizing its remote service and remote maintenance capabilities.

The general functional parameters of the network management software is described in DOCSIS specification #SP-OSSI-I03-990113, a more specific description of the functional parameters of the network management software for radio frequency interfaces is described in DOCSIS specification #SP-RFI-I03-990113, both of which are hereby incorporated in their entirety as if fully set forth herein.

The wireless hub is able to control the all of parameters that can be altered within the wireless modem, including but not limited to, transmission power, upstream channel transmission frequency, and the modulation scheme on which the wireless modem transmits. Further, utilizing the remote maintenance and service process allows the wireless hub, and therefore the operator of the entire network of which the wireless hub is only a part, to even load software updates or new software into the wireless modem without intervention from the wireless modem or its user.

When the wireless hub is remotely maintaining or servicing a wireless modem it can instruct the wireless modem to change its parameters one by one and incrementally, this allows for precise detection, diagnosis and correction of any problems, thereby allowing a quicker return to service if the wireless modem was unable to transmit on the upstream channel.

Additionally, the remote maintenance technique can be used for a single wireless modem or a group of wireless modems in order to allow the wireless hub to evaluate the quality of the network. This type of evaluation allows the wireless hub to dynamically change the upstream transmission parameters in the wireless modem(s) or the frequencies of transmission and improves the quality of the whole network.

For the wireless hub, the ability to remotely service other network elements while communication with the currently non-operational network element is otherwise impeded (thereby making the network element operational again) eases service complaints and can quickly solve problems.

A new mode of operation, of the wireless modem, preferably referred to as service mode was described with respect to FIG. 2. This mode of operation allows the NMS (Network Management System) of the wireless hub to control all the parameters of the wireless modem, including but not limited to, transmission power, transmission frequency, modulation scheme, the upstream channel frequency on which the wireless modem transmits and the antenna positioning. This is because the wireless modem is able to receive the downstream channel even if it is unable to transmit on the upstream channel. The downstream channel transmission is reliable and robust and allows the network management software of the wireless hub to use and control the wireless modem without the need of feedback or reaction. All the set of parameters that can be tuned locally on the modem can be tuned remotely by the hub when the modem is operating in service mode.

The service mode is useful during modem initialization, when the wireless hub detects a problem in the upstream transmission or when a customer complains. The network management software utilizes the MAC address of the modem to operate the modem. This because by using the MAC address, the wireless hub can access the physical layer of the wireless modem.

In service mode, assuming the modem is locked onto the downstream frequency, the wireless hub can slowly change the parameters one by one until such a time as the upstream communication is detected. Then service mode operation can cease and other modes of operation can be initiated.

Figure 3:
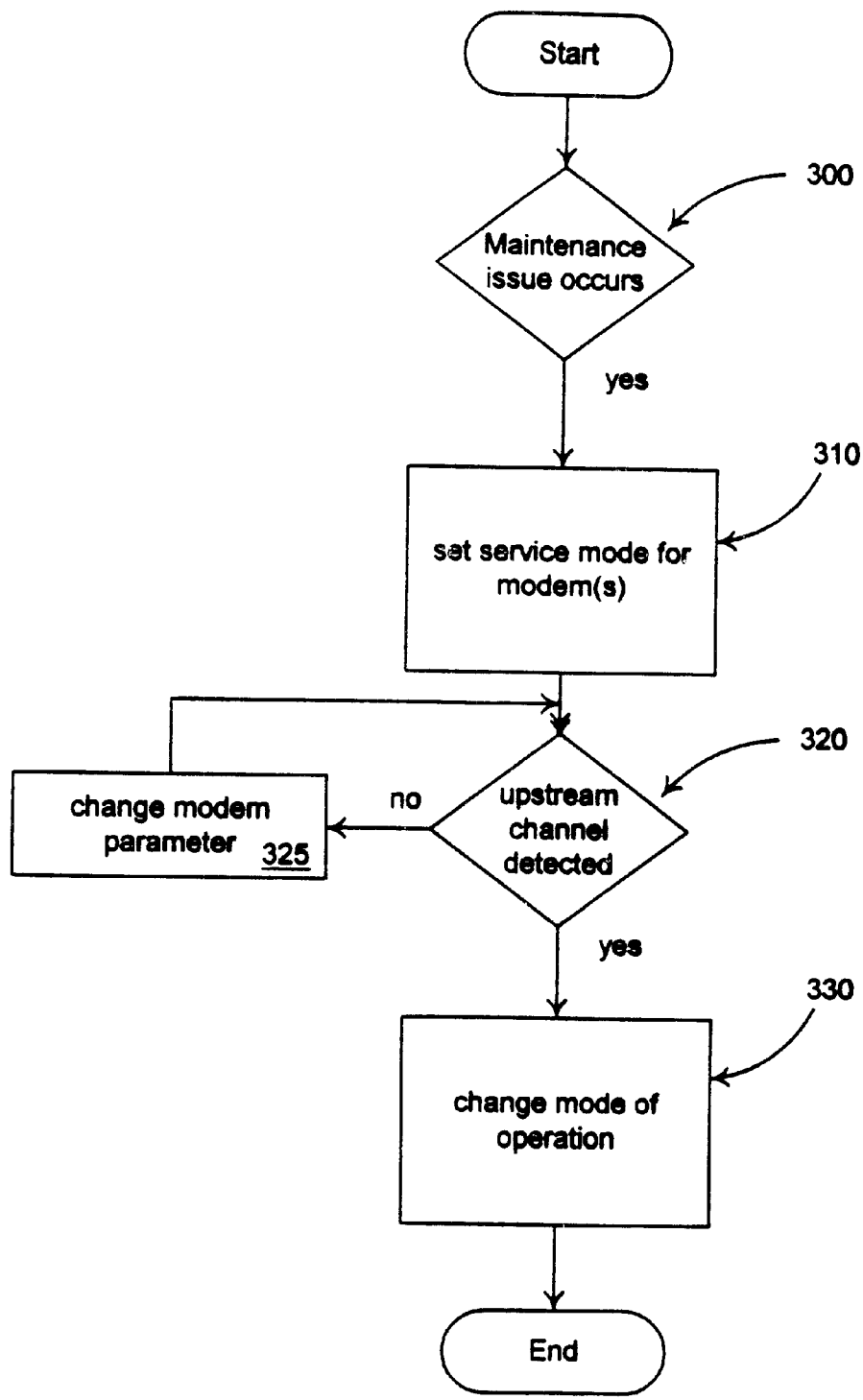
FIG. 3 is a flow chart illustrating an example service mode operation according to an embodiment of the present invention.

FIG. 3 is a flow chart illustrating an example service mode operation of changing parameters according to an embodiment of the present invention. At step 300, a maintenance issue occurs, such a problem is detected by the hub in an upstream transmission, initialization is required, or other issue. The hub sets one or more modems into a service mode (step 410). In the service mode, if an upstream channel is not detected, a parameter of the modem is changed. The parameter changed may be any of the upstream channel, power, modulation, antenna, etc, for example. Any modifiable parameter that affects the performance or operation of the modem can be changed.

Steps 420 and 425 for a loop that executes until an upstream channel is detected. At that time, the mode of operation is changed from service mode to another operational mode such as normal communications, acquiring other channels, etc., for example.

Service mode operation can be performed on a single (singlecast) modem with the MAC address or to a predetermined group (multicast), i.e. a group of modems transmitting on a certain upstream channel.

As described with respect to FIG. 2, the network management software of the wireless hub is able to control the wireless modem(s) in communication with the wireless hub, it is possible to use this capability in order to perform diagnostics on the wireless modems and also to measure the quality of the network.

To be able to perform diagnostics or measure the network quality, the network management software can turn a single modem (singlecast), a group of modems belonging to a certain upstream (multicast) or all the modems (broadcast) to service mode. After setting the wireless modems to a service mode, the network management software can indicate to the modems to start a predetermined transmission.

The presently preferred different settings that can be tested using the predetermined transmission include, but are not limited to:

Continuous wave (CW) or a modulation type (QPSK, for example).

Predetermined power level transmission.

Variable range of frequencies.

A specific antenna configuration.

Specified transmission on a specified channel.

Or any other type of transmission, the variation of can be detected by the wireless hub.

With CW the network management software, referred to above, is able to measure the distortion of the signal for certain frequencies and the overall quality.

With a certain modulation scheme and a pattern created by the PRBS (pseudo random bit sequence), the network management software will check the locked level, the signal to noise ratio, and the correct reception of the pattern data.

When the operator instructs the modem(s) to change the transmission frequencies, the operator is able to evaluate the best values for certain ambient conditions such as weather, topological structure, etc. In the same way, indicating the modems to vary the transmission power, the optimal values will be obtained and can be stored for later use when the conditions occur again. Further, the determination of these values can be utilized to built predictive models that can be used to alter transmission parameters based upon ambient conditions in any given area where the wireless hub and modem are deployed.

Performing these types or diagnostic procedures periodically will give the operator a tool to predetermine a set of parameters for any group of conditions, whether ambient, traffic related or any other set. A forecast can be created that allows for the determination as to how a new group of modems will influence the network.

While the embodiments, applications and advantages of the present invention have been depicted and described, there are many more embodiments, applications and advantages possible without deviating from the spirit of the inventive concepts described and depicted herein. The invention should only be restricted in accordance with the spirit of the claims appended hereto and is not restricted by the preferred embodiments, specification or drawings.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, sending service mode messages to a modem or groups of modems, changing modem parameters while in service mode, detecting upstream communication from the modem(s), and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for remotely testing a wireless modem in communication with a wireless hub, comprising:
   synchronizing a wireless modem with a wireless hub on a downstream channel of a plurality of downstream channels;
   receiving information from the wireless modem on at least one of a plurality of upstream channels that can be used to communicate from the wireless modem to the wireless hub;
   placing the wireless modem into a service mode, by transmitting from the wireless hub an instruction for the wireless modem to operate in the service mode; and
   testing at least one parameter of the wireless modem as directed by the wireless hub to determine an optimal modem set-up for upstream communication from the wireless modem to the wireless hub;
   wherein said at least one parameter is at least one of an antenna configuration and an antenna position.

2. The method according to claim 1, wherein said modem and said hub comprise at least part of a wireless broadband access system.

3. The method according to claim 1, wherein said optimal modem set-up comprises an optimal upstream channel for communication with the wireless hub.

4. The method according to claim 1, wherein said at least one parameter is a modulation scheme selection.

5. The method according to claim 1, further comprising the steps of:
   determining ambient conditions near said modem; and
   placing the modem in an optimal set-up selected by a predictive model based on the ambient coditions.

6. The method according to claim 5, wherein said predictive model is based on previous testing of modem parameters and ambient conditions during the tests, and said ambient conditions include weather and topological structure.

7. The method according to claim 1, wherein said step of receiving information comprises receiving at least one message formatted according to a Data Over Cable System Interface Specification defined message.

8. The method according to claim 1, further comprising the steps of:
   failing to receive the information transmitted from the wireless modem to the wireless hub at the wireless hub; and
   testing at least one of the wireless modem parameters to reestablish an upstream communication path from the wireless modem to the wireless hub.

9. The method of claim 8 wherein the parameters are a group comprising transmission power, tramsmission frequency, modulation scheme, an upstream channel on which the wireless modem transmits, antenna configuration, and antenna positioning.

10. The method according to claim 9, wherein said wireless hub and said wireless modem are part of a broadband access system.

11. A method for performing remote maintenance on a wireless modem in communication with a wireless hub, comprising:
   transmitting from the wireless hub to the wireless modem a first information signal;
   receiving the first information signal transmitted from the wireless hub to the wireless modem at the wireless modem:
   transmitting from the wireless modem to the wireless hub a second information signal;
   receiving the second information signal transmitted from the wireless modem to the wireless hub at the wireless hub;
   transmitting an instruction from the wireless hub to the wireless modem instructing the wireless modem to operate in a service mode;
   operating the wireless modem in a service mode; and
   testing several parameters of the wireless modem as directed by the wireless hub to improve transmission in an upstream communication path from the wireless modem to the wireless hub;
   wherein said several parameters include at least one of an antenna configuration and an antenna position.

12. The method of claim 11 wherein the parameters are selected from a group comprising transmission power, transmission frequency, modulation scheme, an upstream channel on which the wireless modem transmits and antenna positioning.

13. The method of claim 11 further comprising:
   storing at the wireless hub performance statistics of transmission on the upstream communication path based upon changes to the parameters; and
   creating a predictive mode of the operation of a network including the wireless hub and wireless modem based upon the performance statistics.

14. A wireless modem, comprising:
   a service mode device configured to receive at least one service mode instruction from a remote device;
   a test mechanism configured to perform at least one test as directed by the service mode instruction;
   a notification device configured to transmit a result of the test;
   wherein said test comprises at least one of an antenna configuration test and an antenna position test.

15. The wireless modem according to claim 14, wherein said remote device is a wireless hub configured to operate in a wireless broadband access system.

16. The wireless modem according to claim 15, wherein the wireless modem communicates with the wireless hub using at least one message formatted as a Data Over Cable System Interface Standard defined message.

17. The modem according to claim 14, wherein said service mode device is further configured to recognize parameter change service mode commands and change a parameter as specified in the parameter change service mode command.

18. The modem according claim 17 wherein the parameters specified by said parameter change service mode commands include at least one of transmission power, transmission frequency, modulation scheme, an upstream channel on which the wireless modem transmits, antenna configuration, and antenna positioning.

19. The modem according to claim 14, wherein said modem is a Customer Premise Equipment in a wireless broadband access system.

20. A method of determining a status of a wireless modem, comprising the steps of:

receiving at least one instruction from a wireless hub;

testing the wireless modem as directed by said at least one instruction; and sending a result of the test to the wireless hub;

wherein said testing comprises at least one of testing an antenna configuration and testing an antenna position.

21. The method according to claim 20, wherein said at least one instruction includes a MAC address of the modem.

22. The method according to claim 21, wherein said at least one instruction is formatted according to a Data Over Cable System Interface Specification defined message.

* * * * *